(12) United States Patent
Dong et al.

(10) Patent No.: US 10,069,769 B2
(45) Date of Patent: Sep. 4, 2018

(54) ELECTRONIC DEVICE AND METHOD FOR PROVIDING USER PREFERENCE PROGRAM NOTIFICATION IN THE ELECTRONIC DEVICE

(71) Applicant: SAMSUNG ELECTRONICS CO., LTD., Suwon-si (KR)

(72) Inventors: Je-youn Dong, Suwon-si (KR); Seung-won Kim, Seoul (KR); Seung-min Shin, Seoul (KR); Sung-pil Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 136 days.

(21) Appl. No.: 15/163,323

(22) Filed: May 24, 2016

(65) Prior Publication Data
US 2016/0366075 A1 Dec. 15, 2016

(30) Foreign Application Priority Data
Jun. 12, 2015 (KR) .................. 10-2015-0083409

(51) Int. Cl.
*G06F 15/16* (2006.01)
*H04L 12/58* (2006.01)
(Continued)

(52) U.S. Cl.
CPC .......... *H04L 51/04* (2013.01); *H04L 65/4076* (2013.01); *H04L 67/22* (2013.01);
(Continued)

(58) Field of Classification Search
CPC ... H04L 67/306; H04L 65/1069; H04L 67/42; H04L 51/32; H04L 67/02; H04L 67/22;
(Continued)

(56) References Cited

U.S. PATENT DOCUMENTS 6,694,482 B1 * 2/2004 Arellano .......... G06F 17/30017
707/E17.009
8,528,023 B2 9/2013 Svensson et al.
(Continued)

FOREIGN PATENT DOCUMENTS

JP 2007-53518 A 3/2007
JP 2007143183 A 6/2007
(Continued)

OTHER PUBLICATIONS

Loeb, "Architecting Multimedia Personalized Delivery of Information", Communications of the ACM, Association for Computing Machinery, Inc., vol. 35, No. 12, Dec. 1, 1992, pp. 39-48, XP000334363, New York, U.S. (10 pages total).
(Continued)

*Primary Examiner* — Zarni Maung
(74) *Attorney, Agent, or Firm* — Sughrue Mion, PLLC

(57) ABSTRACT

Provided are an electronic device and a method for providing a user preference program notification in the electronic device. The electronic device includes a communicator, and a controller configured to collect a user viewing history, determine a user preference program according to the collected user viewing history, and selectively output, to a user, a notification indicating a start of the broadcasting of the determined user preference program.

18 Claims, 16 Drawing Sheets

(51) Int. Cl.
  *H04L 29/08* (2006.01)
  *H04N 21/433* (2011.01)
  *H04N 21/442* (2011.01)
  *H04N 21/45* (2011.01)
  *H04N 21/466* (2011.01)
  *H04N 21/472* (2011.01)
  *H04N 21/488* (2011.01)
  *H04L 29/06* (2006.01)
  *G06F 12/00* (2006.01)
  *H04N 21/4786* (2011.01)
  *H04N 21/4788* (2011.01)

(52) U.S. Cl.
  CPC ....... *H04L 67/306* (2013.01); *H04N 21/4334* (2013.01); *H04N 21/44222* (2013.01); *H04N 21/4532* (2013.01); *H04N 21/4668* (2013.01); *H04N 21/47214* (2013.01); *H04N 21/4882* (2013.01); *H04N 21/4786* (2013.01); *H04N 21/4788* (2013.01)

(58) Field of Classification Search
  CPC ......... H04L 63/08; H04L 67/18; H04L 67/26; H04L 67/2814; H04L 67/2842; H04L 12/2803; H04L 12/2818; H04L 41/0843; H04L 41/0883; H04L 41/20; H04L 41/22
  See application file for complete search history.

(56) References Cited

U.S. PATENT DOCUMENTS

| | | | |
|---|---|---|---|
| 8,776,149 | B1 | 7/2014 | Koch et al. |
| 2004/0128624 | A1* | 7/2004 | Arellano ........... G06F 17/30017 715/255 |
| 2009/0133065 | A1 | 5/2009 | Inoue et al. |
| 2013/0074110 | A1* | 3/2013 | Myslinski ............. G06Q 10/10 725/14 |
| 2013/0305293 | A1 | 11/2013 | Watanabe et al. |
| 2013/0305307 | A1 | 11/2013 | Nagahama |
| 2014/0282656 | A1* | 9/2014 | Belyaev ........... H04N 21/25841 725/14 |
| 2015/0082330 | A1* | 3/2015 | Yun ...................... H04N 21/233 725/14 |
| 2015/0208120 | A1* | 7/2015 | Yao .................. H04N 21/25833 725/9 |
| 2016/0253710 | A1* | 9/2016 | Publicover ............. G06Q 30/02 705/14.66 |

FOREIGN PATENT DOCUMENTS

| | | |
|---|---|---|
| JP | 2010-147726 A | 7/2010 |
| JP | 2010283656 A | 12/2010 |
| WO | 0237850 A2 | 5/2002 |

OTHER PUBLICATIONS

Communication dated Aug. 11, 2016 issued by the European Patent Office in counterpart European Application No. 16169505.1.
Communication dated Oct. 9, 2017, issued by the European Patent Office in counterpart European Application No. 16169505.1.
Communication dated Jun. 25, 2018 by the European Patent Office in counterpart European Patent Application No. 16169505.1.

* cited by examiner

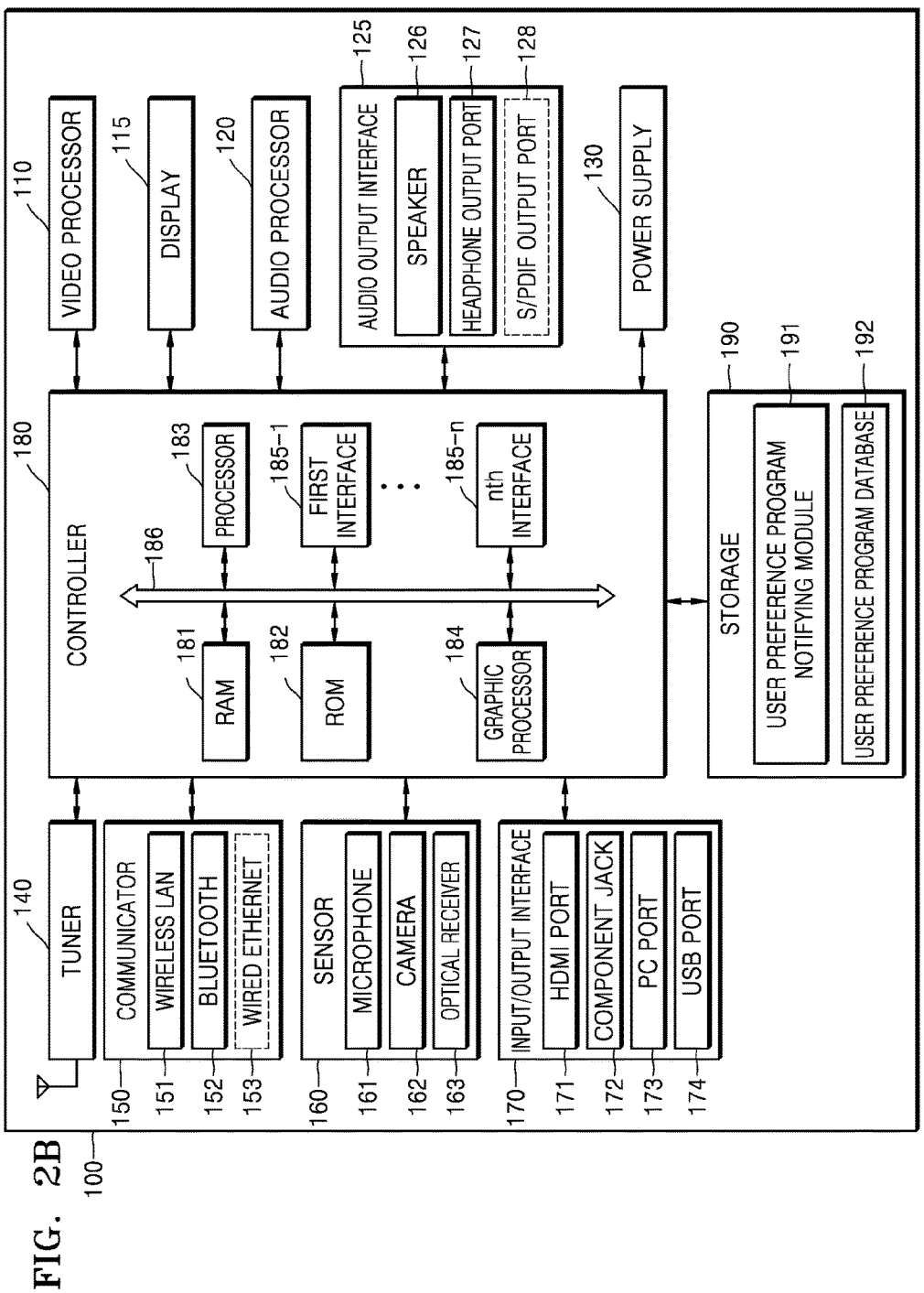

FIG. 8A

| | | SUN | MON | TUE | WED | THU | FRI | SAT |
|---|---|---|---|---|---|---|---|---|
| AM | 12:00-2:00 | | | | | | | |
| | 2:00-4:00 | | | | | | | |
| | 4:00-6:00 | | | | | | | |
| | 6:00-8:00 | | | | | | | |
| | 8:00-10:00 | | | | | | | |
| | 10:00-12:00 | | | | | | | |
| PM | 12:00-2:00 | | | | | | | |
| | 2:00-4:00 | | | | | | | |
| | 4:00-6:00 | | | | | | | |
| | 6:00-8:00 | SBS: Running Man SCORE:3 | | | | | | |
| | 8:00-10:00 | | | | History: Texas Rising SCORE:2 | NatGeo Wild: Deep Blue Carnivore SCORE:5 | | |
| | 10:00-12:00 | | | | | | Discovery: Man vs. Wild SCORE:4 | |

800

810 — SBS: Running Man SCORE:3
820 — History: Texas Rising SCORE:2
830 — NatGeo Wild: Deep Blue Carnivore SCORE:5
840 — Discovery: Man vs. Wild SCORE:4

FIG. 8B

| | | SUN | MON | TUE | WED | THU | FRI | SAT |
|---|---|---|---|---|---|---|---|---|
| AM | 12:00-2:00 | | | | | | | |
| | 2:00-4:00 | | | | | | | |
| | 4:00-6:00 | | | | | | | |
| | 6:00-8:00 | | | | | | | |
| | 8:00-10:00 | | | | | | | |
| | 10:00-12:00 | | | | | | | |
| PM | 12:00-2:00 | | | | | | | |
| | 2:00-4:00 | | | | | | | |
| | 4:00-6:00 | | | | | | | |
| | 6:00-8:00 | SBS: Running Man <br> USER ID / SCORE <br> 3 / 3 <br> — 860 | | | | | | |
| | 8:00-10:00 | | | | History: Texas Rising <br> USER ID / SCORE <br> 1 / 2 <br> — 870 | NatGeo Wild: Deep Blue Carnivore <br> USER ID / SCORE <br> 1 / 5 <br> 2 / 5 <br> 3 / 2 <br> — 880 | | |
| | 10:00-12:00 | | | | | | Discovery: Man vs. Wild <br> USER ID / SCORE <br> 2 / 4 <br> — 890 | |

850

ELECTRONIC DEVICE AND METHOD FOR PROVIDING USER PREFERENCE PROGRAM NOTIFICATION IN THE ELECTRONIC DEVICE

CROSS-REFERENCE TO RELATED APPLICATION

This application claims the benefit of Korean Patent Application No. 10-2015-0083409, filed on Jun. 12, 2015, in the Korean Intellectual Property Office, the disclosure of which is incorporated herein in its entirety by reference.

BACKGROUND

1. Field

The present disclosure relates to electronic devices and methods for providing a user preference program notification in the electronic devices.

2. Description of the Related Art

A display device may have a function of displaying images that may be viewed by a user. The user may view a broadcast through the display device. The display device may display a broadcast corresponding to a broadcast signal selected by the user among the broadcast signals transmitted by broadcasting stations. As a recent worldwide trend, broadcasting has been converted from analog broadcasting into digital broadcasting.

The digital broadcasting may transmit digital video and audio signals. In comparison to the analog broadcasting, the digital broadcasting may provide a low data loss due to its robustness against external noise, an efficient error correction, a high resolution, and a clear screen. Also, unlike the analog broadcasting, the digital broadcasting may provide an interactive service.

Also, recently, a smart TV has been developed to provide various contents in addition to a digital broadcasting function. Instead of operating manually according to the user's selection, the smart TV may aim to analyze and provide the user's desire even without the user's operation.

The TV may have a function for setting a user preference program by selecting a program desired by the user.

SUMMARY

Provided are electronic devices and methods that may more effectively provide a user preference program notification to users.

Additional aspects will be set forth in part in the description which follows and, in part, will be apparent from the description, or may be learned by practice of the presented embodiments.

According to an aspect of an embodiment, an electronic device includes a communicator, and a controller configured to collect a user viewing history, determine a user preference program according to the collected user viewing history, and selectively output, to a user, a notification indicating a start of the broadcasting of the determined user preference program.

The controller may output the notification by using a display when a broadcasting channel currently-displayed on the display is different from a channel of the user preference program.

The controller may output the notification through the display when the display device is in a normal mode, and the controller may transmit the notification to the user through an e-mail or a text message when the display device is in a standby mode.

The notification may include a recording schedule option of the user preference program.

The controller may update a user preference program database corresponding to the user viewing history, in response to detection of a negative/positive reaction of the user to a user preference program notification, based on the reaction.

The user preference program corresponding to the user viewing history may be set on a user-by-user basis.

The controller may output, through the display, a user interface for setting about whether to receive a user preference program notification according to the user viewing history.

The electronic device may further include a display configured to output a user interface indicating the setup of a user preference program notification according to the user viewing history.

The controller may receive the user viewing history from an external device through the communicator.

The controller may transmit a command for instructing to output the notification indicating the start of the broadcasting of the determined user preference program, to the external device through the communicator.

According to an aspect of another embodiment, a method for providing a user preference program notification in an electronic device includes collecting a user viewing history, determining a user preference program according to the collected user viewing history, and selectively outputting, to a user, a notification indicating a start of the broadcasting of the user preference program determined according to the user viewing history.

According to an aspect of another embodiment, a non-transitory computer-readable recording medium that stores a program that performs the above method when executed by a computer.

BRIEF DESCRIPTION OF THE DRAWINGS

These and/or other aspects will become apparent and more readily appreciated from the following description of the embodiments, taken in conjunction with the accompanying drawings in which:

FIG. 2B is a detailed configuration diagram of the display device 100 illustrated in FIG. 2A;

FIG. 8A illustrates an example of a user preference program database 800 managed according to a user viewing history;

FIG. 8B illustrates an example of a user preference program database 850 managed according to a user viewing history on a user-by-user basis;

DETAILED DESCRIPTION

Figure 1:
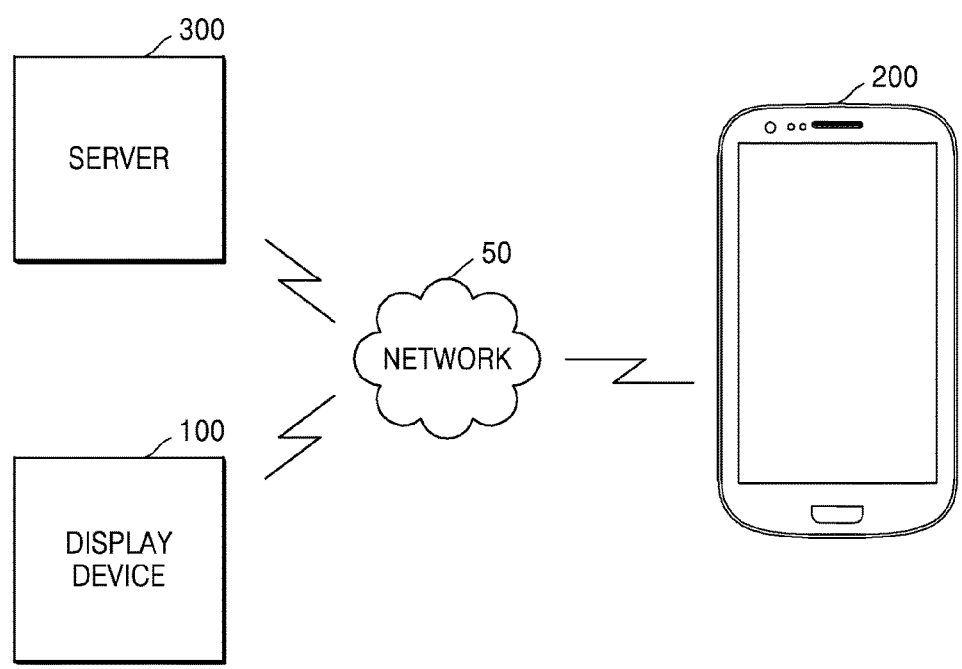
FIG. 1 illustrates a system for notifying a TV preference program according to embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, various embodiments of the inventive concept will be described with reference to the accompanying drawings. The inventive concept may include various embodiments and modifications, and certain embodiments thereof are illustrated in the drawings and will be described herein in detail. However, it will be understood that the inventive concept is not limited to the certain embodiments and includes all modifications, equivalents, and/or substitutions falling within the spirit and scope of the inventive concept. In the specification and drawings, like reference numerals will denote like elements.

As used herein, terms such as "include" and "may include" specify the presence of stated functions, operations, or elements, but do not preclude the presence or addition of one or more other functions, operations, or elements. Also, it will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

As used herein, terms such as "or" and "and/or" may include any and all combinations of one or more of the associated listed items. For example, "A or B" may include "A", "B", or "A and B".

As used herein, terms such as "first" and "second" may modify various elements in various embodiments, but do not limit the various elements. For example, the terms do not limit the order and/or priority of the various elements. The terms may be used to distinguish one element from another element. For example, a first user device and a second user device may all be user devices and may refer to different user devices. For example, without departing from the scope of the inventive concept, a first element may also be referred to as a second element and vice versa.

It will be understood that when an element is referred to as being "connected or coupled" to another element, it may be directly connected or coupled to the other element or may be indirectly connected or coupled to the other element with one or more intervening elements interposed therebetween. On the other hand, when an element is referred to as being "directly connected or coupled" to another element, no intervening element is interposed therebetween.

The terms used herein are for the purpose of describing certain embodiments only and are not intended to limit the inventive concept. As used herein, the singular forms "a", "an", and "the" are intended to include the plural forms as well, unless the context clearly indicates otherwise.

Unless otherwise defined, all terms (including technical and scientific terms) used herein may have the same meanings as commonly understood by those of ordinary skill in the art to which the inventive concept belongs. It will also be understood that terms such as those defined in commonly-used dictionaries should be interpreted as having the meanings that are consistent with their meanings in the context of the relevant art and will not be interpreted in an idealized or overly formal sense unless expressly so defined herein.

Hereinafter, electronic devices according to various embodiments will be described with reference to the accompanying drawings. The term "user" used herein may refer to a person using an electronic device or to a device (e.g., an artificial-intelligence electronic device) using an electronic device.

FIG. 1 illustrates a system for notifying a user preference program according to embodiments.

Referring to FIG. 1, the system may include a display device 100, a mobile device 200, and a server 300 that may communicate with each other through a network 50.

The network 50 may be a telecommunications network. The telecommunications network may include at least one of a computer network, the Internet, the Internet-of-Things (IoT), and a telephone network.

The display device 100 may collect a user viewing history and determine a user preference program according to the collected user viewing history. The display device 100 may transmit a notification indicating the start of the broadcasting of the determined user preference program to the user by using one or more communication means.

According to an embodiment, the display device 100 may output the notification indicating the start of the broadcasting of the user preference program according to the user viewing history through a display of the display device 100.

According to an embodiment, the display device 100 may transmit the notification indicating the start of the broadcasting of the user preference program according to the user viewing history to the user by using one or more communication means, for example, an e-mail, a text message, or a Short Message Service (SMS). The text message or the SMS may be displayed on the mobile device 200 of the user.

The server 300 may receive and manage information about the user viewing history in the display device 100 and determine the user preference program according to the user viewing history. The server 300 may transmit a notification indicating the start of the broadcasting of the determined user preference program to the display device 100 or the mobile device 200 through the network 50.

Those of ordinary skill in the art will easily understand that the display device 100 in the system illustrated in FIG. 1 may include, but is not limited to, an analog TV, a digital TV, a 3D TV, a smart TV, an LED TV, an OLED TV, a plasma TV, or a monitor.

Although not illustrated in FIG. 1, the system may further include an IP set-top box or a set-top box connected to the display device 100. The set-top box or the IP set-top box may include a communicator and a processor and may provide a multimedia communication service by connecting with an external network.

According to an embodiment, the IP set-top box or the set-top box connected to the display device 100 may collect a user viewing history by receiving the user viewing history of the display device 100 from the display device 100, determine a user preference program according to the collected user viewing history, and transmit a notification indicating the start of the broadcasting of the determined user preference program to the display device 100 or to the user through an e-mail or a text message.

The server 300 and the mobile device 200 in the system illustrated in FIG. 1 may all be referred to as an electronic device and a computing device and may operate with a communicator and a processor; however, herein, for convenience' sake, they will be referred to simply as a server and a mobile device.

Figure 2A:
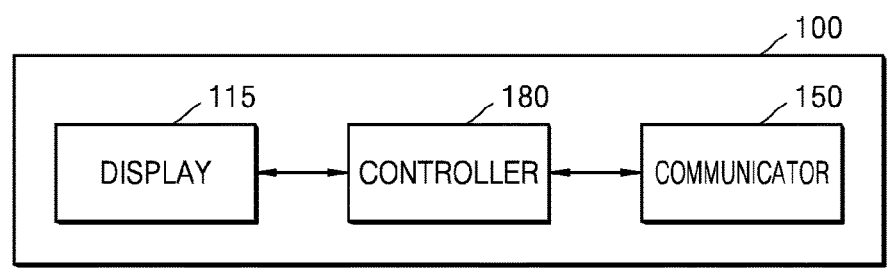
FIG. 2A is a block diagram of a display device 100 according to an embodiment.

FIG. 2A is a block diagram of the display device 100 according to an embodiment.

Referring to FIG. 2A, the display device 100 may include a controller 180, a communicator 150, and a display 115.

The display 115 may display a screen provided by the controller 180. Through this screen, the display 115 may display the notification indicating the start of the broadcasting of the user preference program determined according to the user viewing history.

The communicator 150 may receive a broadcast signal from outside or may enable communication with the server 300 and the mobile device 200.

The controller 180 may control all the elements of the display device 100 including the display 115 and the communicator 150. The controller 180 may include a processor, a ROM that stores a control program for controlling a peripheral device, and a RAM that stores a signal or data input from outside the display device 100 or is used as a storage region corresponding to various operations performed by the display device 100. The processor may be implemented as a System-on-Chip (SoC) including a combination of a GPU (not illustrated) and a core (not illustrated). Also, the processor may include a plurality of processors.

The controller 180 may manage the user viewing history and determine the user preference program according to the user viewing history.

According to an embodiment, the controller 180 may selectively display a notification indicating the start of the broadcasting of the user preference program determined according to the user viewing history by using the display 115.

According to an embodiment, the controller 180 may display the notification by using the display 115 when a broadcasting channel currently-displayed on the display 115 is different from a channel of the user preference program determined according to the user viewing history.

According to an embodiment, the controller 180 may display the notification through the display 115 when the display device 100 is in a normal mode, and may transmit the notification to the user through an e-mail or a text message when the display device 100 is in a standby mode. The normal mode may refer to a normal operation state in which the display device 100 outputs contents through the display 115, and the standby mode may refer to a state in which the display device 100 does not output contents through the display 115 and waits for an input from the user for normal operation.

According to an embodiment, the controller 180 may include a recording schedule option of the user preference program in the notification.

According to an embodiment, the controller 180 may receive a negative/positive reaction of the user to a user preference program notification and reflect the reaction in a user preference program database corresponding to the user viewing history.

According to an embodiment, the controller 180 may set the user preference program corresponding to the user viewing history on a user-by-user basis.

According to an embodiment, the controller 180 may output, through the display 115, a user interface (UI) for setting about whether to receive the user preference program notification according to the user viewing history.

According to an embodiment, the controller 180 may output, through the display 115, a user interface indicating the setup of the user preference program notification according to the user viewing history.

The function performed by the display device 100, that is, the function of collecting the user viewing history, determining the user preference program according to the collected user viewing history, and outputting the notification indicating the start of the broadcasting of the determined user preference program may be performed not only by the display device 100 but also by the server 300 or the IP set-top box or the set-top box connected to the display device 100.

FIG. 2B is a detailed configuration diagram of the display device 100 illustrated in FIG. 2A.

Referring to FIG. 2B, the display device 100 may include a video processor 110, a display 115, an audio processor 120, an audio output interface 125, a power supply 130, a tuner 140, a communicator 150, a sensor 160, an input/output interface 170, a controller 180, and a storage 190.

The video processor 110 may perform processing on video data received by the display device 100. The video processor 110 may perform various image processing on the video data, such as decoding, scaling, noise filtering, frame rate conversion, and resolution conversion.

The display 115 may display the video included in the broadcast signal received through the tuner 140 under the control of the controller 180. Also, the display 115 may display the contents (e.g., moving images) input through the input/output interface 170 or the communicator 150. The display 115 may output the image stored in the storage 190 under the control of the controller 180. Also, the display 115 may display a voice UI (e.g., including a voice instruction guide) for performing a voice recognition task corresponding to voice recognition, or a motion UI (e.g., including a user motion guide for motion recognition) for performing a motion recognition task corresponding to motion recognition.

According to an embodiment, the display 115 may display the notification indicating the start of the broadcasting of the user preference program determined according to the user viewing history under the control of the controller 180.

According to an embodiment, the display 115 may display the user interface for setting about whether to receive the user preference program notification determined according to the user viewing history under the control of the controller 180.

According to an embodiment, the display 115 may display the user interface indicating the setup of the user preference program notification according to the user viewing history under the control of the controller 180.

The audio processor 120 may perform processing on audio data. The audio processor 120 may perform various processing on the audio data, such as decoding, amplification, and noise filtering. The audio processor 120 may include a plurality of audio processing modules for processing the audios corresponding to a plurality of contents.

The audio output interface 125 may output the audio included in the broadcast signal received through the tuner 140 under the control of the controller 180. The audio output interface 125 may output the audio (e.g., voice and sound) input through the input/output interface 170 or the communicator 150. Also, the audio output interface 125 may output the audio stored in the storage 190 under the control of the controller 180. The audio output interface 125 may include at least one of a speaker 126, a headphone output port 127, and an S/PDIF (Sony/Philips Digital Interface) output port 128. The audio output interface 125 may include a combination of the speaker 126, the headphone output port 127, and the S/PDIF output port 128.

According to an embodiment, the audio output interface 125 may output the notification indicating the start of the broadcasting of the user preference program determined according to the user viewing history in the form of a sound under the control of the controller 180.

The power supply 130 may supply the power, which is input from an external power source, to the internal elements 110 to 190 of the display device 100 under the control of the controller 180. Also, the power supply 130 may supply the power, which is output from one or more batteries (not illustrated) located in the display device 100, to the internal elements 110 to 190 under the control of the controller 180.

According to an embodiment, in order for the display device 100 to provide the notification indicating the start of the broadcasting of the user preference program according to the user viewing history even in the standby mode, the power supply 130 may supply the power to some elements of the display device 100 for performing the notification function, for example, a portion of the controller 180 and a portion of the communicator 150.

The tuner 140 may process the broadcast signal, which is received in a wired or wireless manner, through amplification, mixing, and/or resonance, and may tune and select only the frequency of a channel, which is to be received by the display device 100, among a plurality of received wave components. The broadcast signal may include audio, video, and additional information (e.g., electronic program guide (EPG)).

The tuner 140 may receive a broadcast signal in a frequency band corresponding to a channel number (e.g., cable broadcast No. 506) according to a user input (e.g., control signals received from a control device, such as a channel number input, a channel up-down input, and a channel input on an EPG screen).

The tuner 140 may receive broadcast signals from various sources such as terrestrial broadcasting, cable broadcasting, satellite broadcasting, and Internet broadcasting. The tuner 140 may also receive a broadcast signal from a source such as analog broadcasting or digital broadcasting. The broadcast signal received through the tuner 140 may be divided into audio, video, and/or additional information by decoding (e.g., audio decoding, video decoding, or additional information decoding). The audio, video, and/or additional information may be stored in the storage 190 under the control of the controller 180.

The display device 100 may include one or more tuners 140. The tuner 140 may be implemented as an all-in-one type with respect to the display device 100, or may be implemented by a tuner (not illustrated) connected to the input/output interface 170 and/or a separate device (e.g., a set-top box (not illustrated)) having a tuner connected electrically with the display device 100.

The communicator 150 may connect the display device 100 with an external device (e.g., an audio device) under the control of the controller 180. The controller 180 may transmit/receive contents to/from the external device connected through the communicator 150, download an application from the external device, or perform Web browsing. The communicator 150 may include any one of wireless LAN 151, Bluetooth 152, and wired Ethernet 153 corresponding to the structure and performance of the display device 100. Also, the communicator 150 may include any combination of the wireless LAN 151, the Bluetooth 152, and the wired Ethernet 153. The communicator 150 may receive a control signal of the control device under the control of the controller 180. The control signal may be implemented as a Bluetooth type, an RF signal type, or a Wi-Fi type.

The communicator 150 may further include other short-range communications (e.g., NFC (Near Field Communication; not illustrated) and BLE (Bluetooth Low Energy; not illustrated)) in addition to Bluetooth.

According to an embodiment, the communicator 150 may transmit information about the user viewing history to the server 300.

According to an embodiment, for example, the communicator 150 may transmit the notification indicating the start of the broadcasting of the user preference program determined according to the user viewing history through an e-mail or a text message.

The sensor 160 may sense a user's voice, a user's image, or a user's interaction.

A microphone 161 may receive a user's utterance voice. The microphone 161 may convert the received voice into an electrical signal and output the electrical signal to the controller 180. The user's voice may include, for example, a voice corresponding to the function or menu of the display device 100. The microphone 161 may have a recognition range of less than about 4 m from the microphone 161 to the user, and the recognition range of the microphone 161 may vary according to the peripheral environment (e.g., speaker sound and peripheral noise) and the size of a user's voice.

The microphone 161 may be implemented as an integrated or separate type with respect to the display device 100. The separate microphone 161 may be electrically connected with the display device 100 through the input/output interface 170 and/or the communicator 150.

Those of ordinary skill in the art will easily understand that the microphone 161 may be excluded according to the structure and performance of the display device 100.

A camera 162 may receive an image (e.g., a continuous frame) corresponding to a user's motion including a gesture within a camera recognition range. For example, the recognition range of the camera 162 may have a distance of about 0.1 m to about 5 m from the camera 162 to the user. The user's motion may include, for example, a motion of a user's portion or a user's body portion such as a user's face, look, hand, fist, or finger. Under the control of the controller 180, the camera 162 may convert the received image into an electrical signal and output the electrical signal to the controller 180.

Based on the received motion recognition result, the controller 180 may select a menu displayed on the display device 100 or may perform a control corresponding to the motion recognition result. For example, the control may include channel adjustment, volume adjustment, and indicator movement.

The camera 162 may include a lens (not illustrated) and an image sensor (not illustrated). The camera 162 may support an optical zoom or a digital zoom by using a plurality of lenses and image processing. The recognition range of the camera 162 may be set variously according to the camera angle and the peripheral environmental conditions. When the camera 162 includes a plurality of cameras, it may receive a three-dimensional (3D) still image or a 3D motion by using the plurality of cameras.

The camera 162 may be implemented as an integrated or separate type with respect to the display device 100. A separate device (not illustrated) including the separate camera 162 may be electrically connected with the display device 100 through the input/output interface 170 and/or the communicator 150.

According to an embodiment, the camera 162 may recognize the user by photographing the user viewing a TV. The recognized user information may be used to determine the user preference program according to the user viewing history on a user-by-user basis. For example, when there are three family members, the camera 162 may recognize the face of each of the three family members.

Those of ordinary skill in the art will easily understand that the camera 162 may be excluded according to the structure and performance of the display device 100.

An optical receiver 163 may receive an optical signal (including a control signal), which is received from an external control device, through an optical window (not illustrated) of a bezel of the display 115. The optical receiver 163 may receive an optical signal corresponding to a user input (e.g., touch, press, touch gesture, voice, or motion) from the control device. The control signal may be extracted from the received optical signal under the control of the controller 180.

The input/output interface 170 may receive, for example, a video (e.g., moving image), an audio (e.g., voice and music), and additional information (e.g., EPG) from outside the display device 100 under the control of the controller 180. The input/output interface 170 may include any one of an HDMI (High-Definition Multimedia Interface) port 171, a component jack 172, a PC port 173, and a USB port 174. The input/output interface 170 may include any combination of the HDMI port 171, the component jack 172, the PC port 173, and the USB port 174.

Those of ordinary skill in the art will easily understand that the operation and configuration of the input/output interface 170 may be implemented variously according to embodiments.

The controller 180 may control the overall operation of the display device 100 and the signal flow between the internal elements 110 to 190 of the display device 100 and perform a data processing function. When there is a user's input or a preset stored condition is satisfied, the controller 180 may execute various applications and an operation system (OS) stored in the storage 190.

The controller 180 may include a processor 183, a ROM 182 that stores a control program for controlling the display device 100, and a RAM 181 that stores a signal or data input from outside the display device 100 or is used as a storage region corresponding to various operations performed by the display device 100.

The processor 183 may include a graphic processor (not illustrated) for graphic processing corresponding to video. The processor 183 may be implemented as an SoC including a combination of a GPU (not illustrated) and a core (not illustrated). Also, the processor 183 may include a plurality of processors.

A graphic processor 184 may generate a screen including various objects such as icons, images, and texts by using an operator (not illustrated) and a renderer (not illustrated).

First to nth interfaces 185-1 to 185-*n* may be connected with the above various elements. One of the first to nth interfaces 185-1 to 185-*n* may be a network interface that is connected with an external device through a network.

The RAM 181, the ROM 182, the processor 183, the graphic processor 184, and the first to nth interfaces 185-1 to 185-*n* may be connected to each other through an internal bus 186.

In the present embodiment, the controller 180 of the display device 100 may include the processor 183, the ROM 182, and the RAM 181.

According to an embodiment, the controller 180 may output the notification indicating the start of the broadcasting of the user preference program according to the user viewing history to the user by using a user preference program notifying module 191 stored in the storage 190.

According to an embodiment, the controller 180 may manage the TV viewing history of the user by using the user preference program notifying module 191. According to the control signal of the control device input by the user, the controller 180 may store and manage the program information and the channel number of the broadcast signal selected by the tuner 140, in a user preference program database 192 of the storage 190. For example, the controller 180 may manage the program information viewed by the user for a week, score each program viewed by the user, and manage the program as the user preference program when the program has a certain score or more.

According to an embodiment, the controller 180, when it is time to start the broadcasting of the determined user preference program, the controller 180 may output the notification indicating the start of the broadcasting of the user preference program to the user before the start of the broadcasting by using one or more communication means. The one or more communication means may include, for example, the display on the display 115 of the display device 100, the transmission of a text message to the mobile device 200 of the user, and the transmission of an e-mail to the e-mail address of the user.

According to an embodiment, in the user preference program database, the controller 180 may reflect a user's reaction to the determined user preference program notification, that is, a positive reaction of the user viewing the user preference program according to the user preference program notification or a negative reaction of the user ignoring the user preference program notification without viewing the user preference program in response to the user preference program notification. For example, the positive reaction of the user may increase the score of the user preference program, and the negative reaction of the user may decrease the score of the user preference program. The user preference program database management will be described later in detail with reference to FIG. 8.

According to an embodiment, for example, the controller 180 may manage the user preference program on a user-by-user basis by using the result of recognizing the user by using the camera 162.

Those of ordinary skill in the art will easily understand that the operation and configuration of the controller 180 may be implemented variously according to embodiments.

The storage 190 may store various data, programs, or applications for operating and controlling the display device 100 under the control of the controller 180. The storage 190 may store the input/output signals or data corresponding to the operations of the video processor 110, the display 115, the audio processor 120, the audio output interface 125, the power supply 130, the tuner 140, the communicator 150, the sensor 160, and the input/output interface 170. The storage 190 may store a control program for controlling the display device 100, an application provided initially by the manufacturer or downloaded from outside; a graphical user interface (GUI) related to the application, objects (e.g., image texts, icons, or buttons) for providing the GUI, user information; documents, databases, or related data.

In an embodiment, the term "storage" may include the storage 190, the RAM 181 or the ROM 182 of the controller 180, or a memory card (e.g., micro SD card or USB memory (not illustrated)) attached to the display device 100. Also, the storage 190 may include a nonvolatile memory, a volatile memory, a hard disk drive (HDD), or a solid state drive (SSD).

The storage 190 may include a broadcast receiving module, a channel control module, a volume control module, a communication control module, a voice recognition module, a motion recognition module, an optical receiver module, a display control module, an audio control module, an external input control module, a power control module, a power control module of an external device wirelessly (e.g., Bluetooth) connected, a voice database (DB), or a motion DB (not illustrated). The controller 180 may perform each function by using the software stored in the storage 190.

Each of the modules may include instructions for performing various functions provided by the mobile device, and the functions of the modules may be intuitively derived from their names by those of ordinary skill in the art.

According to an embodiment, the storage 190 may store the user preference program database 192 according to the user viewing history. This will be described later in detail with reference to FIG. 8.

According to an embodiment, the storage 190 may include the user preference program notifying module 191 for outputting the notification indicating the start of the broadcasting of the user preference program determined according to the user viewing history to the user.

As described above, the server 300 may also store and manage the user preference program database according to the user viewing history.

At least one of the elements (e.g., 110 to 190) of the display device 100 illustrated in FIG. 2B may be added or deleted according to the performance of the display device 100. Also, those of ordinary skill in the art will easily understand that the positions of the elements (e.g., 110 to 190) may be modified according to the structure or performance of the display device 100.

Figure 3:
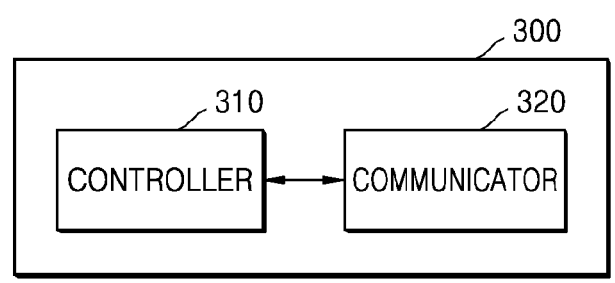
FIG. 3 is a schematic block diagram of a server 300 according to an embodiment.

FIG. 3 is a schematic block diagram of the server 300 according to an embodiment.

Referring to FIG. 3, the server 300 may include a controller 310 and a communicator 320.

The communicator 320 may receive information about the user viewing history from the display device 100.

The controller 310 may include a processor, a ROM that stores a control program for controlling a peripheral device, and a RAM that stores a signal or data input from outside the display device 100 or is used as a storage region corresponding to various operations performed by the peripheral device. The processor may be implemented as an SoC including a combination of a GPU (not illustrated) and a core (not illustrated). Also, the processor may include a plurality of processors.

The controller 310 may store and manage the received user viewing history and determine the user preference program according to the user viewing history.

According to an embodiment, before the start of the broadcasting of the user preference program determined according to the user viewing history, the controller 310 may transmit the notification indicating the start of the broadcasting of the user preference program to the display device 100, or to the mobile device 200 of the user through a text message, or to the e-mail address of the user.

Figure 4:
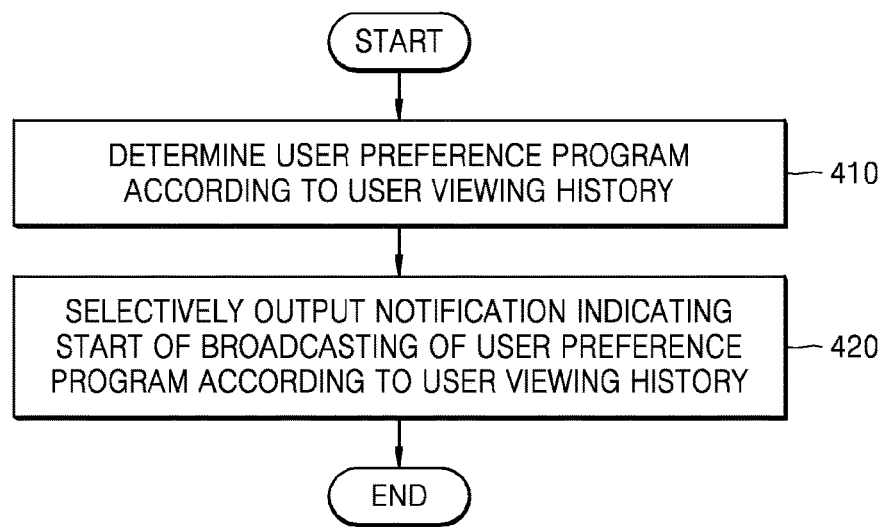
FIG. 4 is a flow diagram illustrating a process for notifying a user preference program according to a TV viewing history of a user according to an embodiment.

FIG. 4 is a flow diagram illustrating a process for notifying a user preference program according to a TV viewing history of the user according to an embodiment.

Referring to FIG. 4, in operation 410, the display device 100 may determine the user preference program according to the user viewing history. A detailed process of operation 410 will be described later with reference to FIGS. 5 to 8.

In operation 420, the display device 100 may selectively output the notification indicating the start of the broadcasting of the user preference program according to the user viewing history. A detailed process of operation 420 will be described later with reference to FIGS. 9 to 11B.

According to an embodiment, the operation illustrated in FIG. 4 may also be performed by the server 300. The server 300 may collect information about the user viewing history from the display device 100, manage the user viewing history information, and determine the user preference program from the user viewing history information. Also, the server 300 may transmit the notification indicating the start of the broadcasting of the determined user preference program to the display device 100, or to the e-mail address of the user, or to the mobile device 200 of the user.

Figure 5:
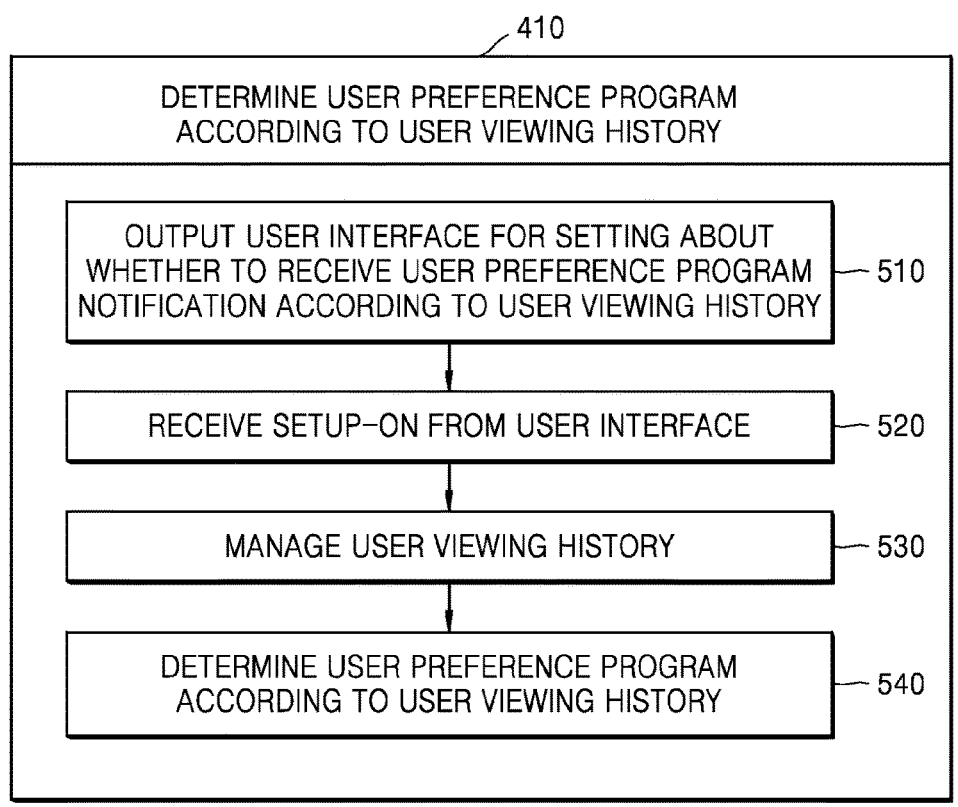
FIG. 5 is a flow diagram illustrating a process for determining a user preference program according to a user viewing history in operation 410 illustrated in FIG. 4.

FIG. 5 is a flow diagram illustrating a process for determining a user preference program according to a user viewing history in operation 410 illustrated in FIG. 4.

Referring to FIG. 5, in operation 510, the display device 100 may output the user interface for setting about whether to receive the user preference program notification according to the user viewing history.

In order to provide a user preference program notification service according to the user viewing history according to the user's desire, the display device 100 may provide the user interface for setting by the user. For example, the display device 100 may output the user interface as illustrated in FIG. 6.

Figure 6:
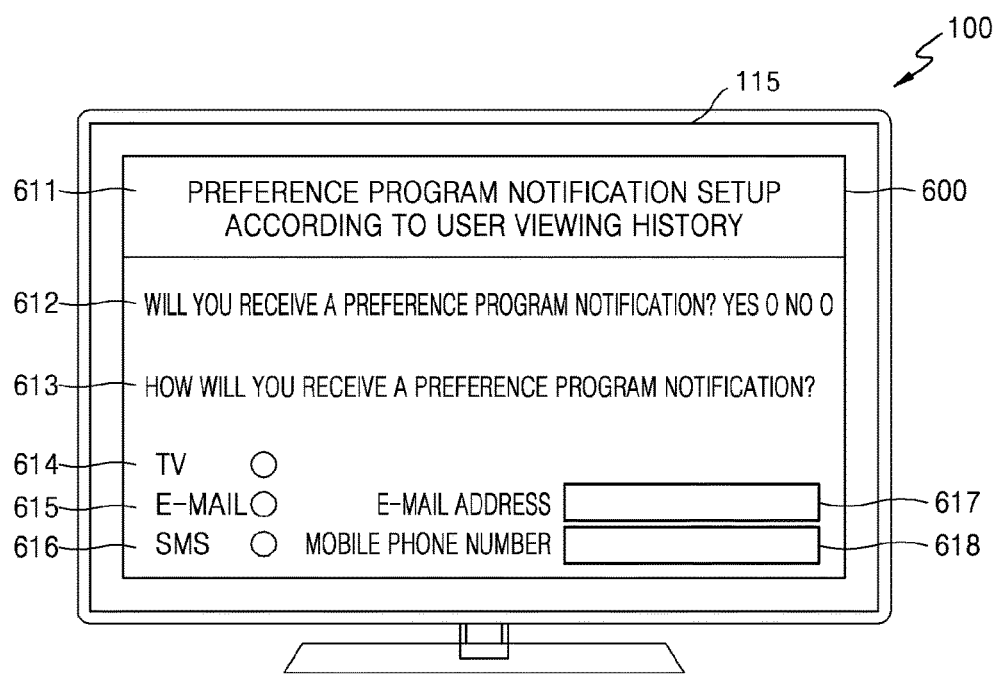
FIG. 6 illustrates an example of a user interface for a preference program notification setup according to a user viewing history according to an embodiment.
Figure 6:
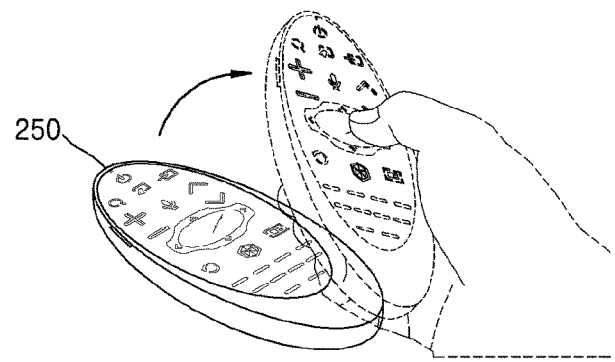

FIG. 6 illustrates an example of a user interface for a preference program notification setup according to a user viewing history according to an embodiment.

Referring to FIG. 6, the controller 180 of the display device 100 may output a user interface 600 on the display 115.

The user interface 600 may include a message item 611 for notifying <PREFERENCE PROGRAM NOTIFICATION SETUP ACCORDING TO USER VIEWING HISTORY>, a preference program notification setup item 612 containing a message <WILL YOU RECEIVE A PREFERENCE PROGRAM NOTIFICATION?> for inquiring about whether to set up the preference program notification, a communication means item 613 containing a message <HOW WILL YOU RECEIVE A PREFERENCE PROGRAM NOTIFICATION?> for selecting a communication means for receiving the preference program notification, a TV item 614 for selecting a communication means, an e-mail item 615, and an SMS item 616.

For example, when the user selects <YES> in the preference program notification setup item 612, the controller 180 of the display device 100 may execute a user preference program notification function by using the user preference program notifying module 191. For example, when the user selects <NO> in the preference program notification setup item 612, the display device 100 may not perform a user preference program notification function.

When the user selects <YES> in the preference program notification setup item 612, the user may select a communication means for receiving the preference program notification. Referring to FIG. 6, for example, the user may select one or more of a TV, an e-mail address, and an SMS as the means for receiving the preference program notification. The user interface 600 may include an item 617 for inputting an e-mail address to receive the preference program notification through an e-mail, and an item 618 for inputting a mobile phone number to receive the preference program notification through a text message or an SMS.

The user may input information or select a desired item in the user interface 600 by using a motion, a button, or a keypad of a control device 250.

The user interface 600 illustrated in FIG. 6 is merely an example, and the user interface for the preference program notification setup according to the user viewing history may be modified variously according to embodiments.

In operation 520, the display device 100 may receive an input for turning on the preference program notification setup according to the user viewing history, that is, an input for selecting <YES> about whether to set up, from the user interface 600.

Figure 7:
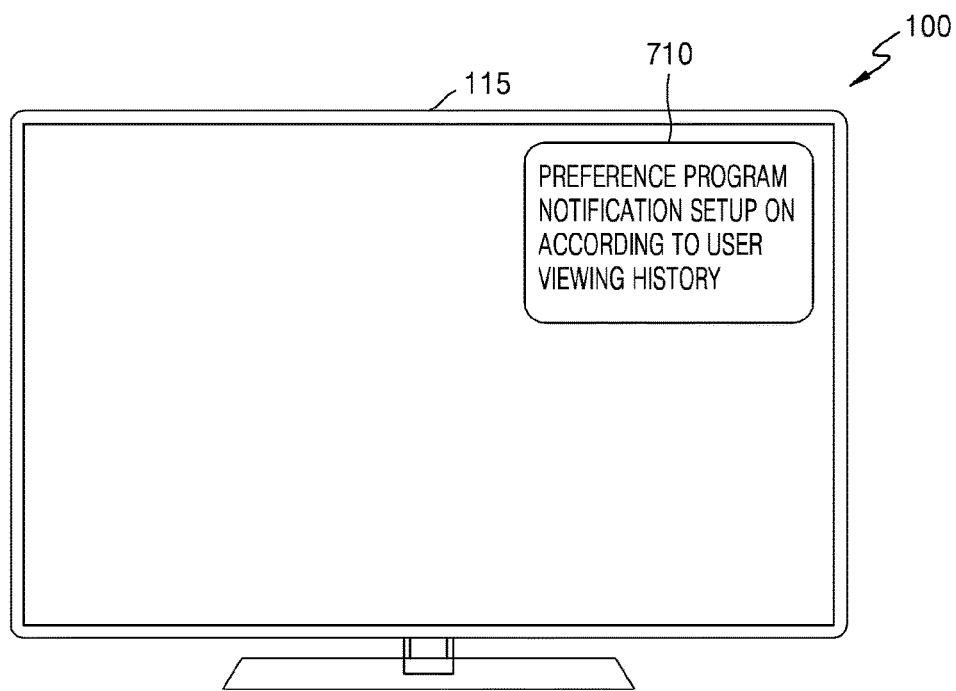
FIG. 7 illustrates an example of a user interface for notifying the turn-on of a user preference program notification setup according to an embodiment.

According to an embodiment, when receiving the input for turning on the preference program notification setup according to the user viewing history, the display device 100 may output an icon 710 containing a message <PREFERENCE PROGRAM NOTIFICATION SETUP ON ACCORDING TO USER VIEWING HISTORY> on the display 115 as illustrated in FIG. 7.

According to an embodiment, the icon 710 may be displayed with a small size at a right top portion of the screen of the display 115 as illustrated in FIG. 7, or may be displayed at a center portion or any position of the display 115.

According to an embodiment, the display device 100 may display the icon 710 for a predetermined time period.

In operation 530, the display device 100 may manage the user viewing history. The controller 180 of the display device 100 may manage the history about the broadcast program viewed by the user, by monitoring the broadcast signal corresponding to the channel number selected by the tuner 140 based on the user input.

In operation 540, the display device 100 may determine the user preference program according to the user viewing history. The display device 100 may determine the user preference program based on the user viewing history by using a prediction model. According to an embodiment, the display device 100 may determine the user preference program by predicting a user preference program by analyzing the viewing pattern of the user based on the user viewing history data collected by TV broadcast channel monitoring. For this purpose, the display device 100 may use a suitable learning algorithm based on machine learning. The machine learning may refer to a technology for allowing a computer to recognize a pattern by training based on the data accumulated in the past, and the learning algorithm is not limited thereto. For example, when a user's pattern of having viewed a program between 10 p.m. and 11 p.m. on Monday three or more times for one month is recognized, the user is predicted to also view the program between 10 p.m. and 11 p.m. on next Monday.

According to an embodiment, the prediction model may determine the user preference program according to the user's frequent viewing history.

According to an embodiment, the prediction model may determine the user preference program according to the user's recent viewing history.

According to an embodiment, the prediction model may determine the user preference program based on both the user's frequent viewing history and the user's recent viewing history.

An example in which the display device 100 manages the user viewing history and determines the user preference program according to the user's frequent viewing history will be described below with reference to FIGS. 8A and 8B.

FIG. 8A illustrates an example of a user preference program database 800 managed according to a user viewing history.

Referring to FIG. 8A, the display device 100 may manage the user viewing history in the form of the database 800. The display device 100 may manage the programs viewed by the user on a daily and hourly basis. The display device 100 may store programs, which have been viewed at least once, in the database and may score each of the programs according to the number of times of viewing. For example, a "Running Man" program 810 of the SBS channel has a score of 3; a "Texas Rising" program 820 of the History channel has a score of 2; a "Deep Blue Carnivore" program 830 of the Nat Geo Wild channel has a score of 5; and a "Man vs. Wild" program 840 of the Discovery channel has a score of 4. For example, whenever the user views a program, the score thereof may increase by 1.

According to an embodiment, the display device 100 may designate the program having a score of a certain value or more, as the user preference program. For example, when a score value for designation as the user preference program is 4, the "Deep Blue Carnivore" program 830 of the Nat Geo Wild channel and the "Man vs. Wild" program 840 of the Discovery channel may be designated as the user preference program in the example illustrated in FIG. 8A.

According to an embodiment, the display device 100 may reflect the user's positive or negative reaction to the user preference program notification in the database 800. For example, the user's positive reaction may include the user's turning on the TV and then viewing the notified program according to the notification of the display device 100, or the user's changing into a channel of the program according to the notification thereof while viewing another channel. For example, the user's negative reaction may include the user's turning on the TV and then not viewing the notified program despite the notification of the display device 100, or the user's still viewing another channel despite the notification thereof.

For example, when the display device 100 notifies the "Deep Blue Carnivore" program 830 of the Nat Geo Wild channel as the user preference program to the user and the user shows a positive reaction to the notification, that is, the user changes the channel into the "Deep Blue Carnivore" program 830 of the Nat Geo Wild channel according to the notification of the display device 100 while viewing another program, the display device 100 may increase the score of the "Deep Blue Carnivore" program 830 by 1.

For example, when the display device 100 notifies the "Man vs. Wild" program 840 of the Discovery channel as the user preference program to the user and the user shows a negative reaction to the notification, that is, the user does not change the channel into the "Man vs. Wild" program 840 of the Discovery channel despite the notification of the display device 100 while viewing another program, the display device 100 may decrease the score of the "Man vs. Wild" program 840 by 1.

In this manner, since the user's reaction is dynamically reflected in the database 800, the user viewing history may be well reflected to determine the user preference program.

FIG. 8B illustrates an example of a user preference program database 850 managed according to a user viewing history on a user-by-user basis.

Referring to FIG. 8B, the user preference program is displayed on a daily and hourly basis as illustrated in FIG. 8A, and the user ID and the score are included in the user preference program item to display the user preference program on a user-by-user basis.

For example, a "Running Man" program 860 of the SBS channel has a score of 3 with respect to the user having a user ID of 3; a "Texas Rising" program 870 of the History channel has a score of 2 with respect to the user having a user ID of 1; a "Deep Blue Carnivore" program 880 of the Nat Geo Wild channel has a score of 5 with respect to the user having a user ID of 1, a score of 5 with respect to the user having a user ID of 2, and a score of 2 with respect to the user having a user ID of 3; and a "Man vs. Wild" program 890 of the Discovery channel has a score of 4 with respect to the user having a user ID of 2.

The display device 100 may recognize the user viewing the currently-displayed screen of the display device 100 by using the attached camera and may manage the score of the user preference program with respect to each of the recognized users.

For example, when the display device 100 determines the program having a score of 4 or more as the user preference program and notifies the determined user preference program, the display device 100 may notify the "Deep Blue Carnivore" program 880 of the Nat Geo Wild channel and the "Man vs. Wild" program 890 of the Discovery channel as the user preference program based on the user preference program database 850.

In the case where the broadcasting of the "Deep Blue Carnivore" program 880 of the Nat Geo Wild channel will start at 8 p.m. on Thursday, when the display device 100 checks the state of the display device 100 before (for example, 10 minutes before) 8 p.m. on Thursday and determines that the users having user IDs of 1 and 2 do not view the "Deep Blue Carnivore" program 880, that is, the display device 100 is in a standby mode or the users view other channels, the display device 100 may notify the start of the broadcasting of the "Deep Blue Carnivore" program 880 to the users having user IDs of 1 and 2. Also, since the display device 100 may recognize the user by using the camera or the like, when the user having a user ID of 1 is recognized in front of the display device 100 in the process of checking the state of the display device 100 but the user having a user ID of 2 is not recognized by the display device 100 for not being located in front of the display device 100, the display device 100 may determine that the user having a user ID of 2 does not view the program and then may notify the user preference program only to the user having a user ID of 2. Since the user having a user ID of 3 has a score of 2 smaller than 4, the "Deep Blue Carnivore" program 880 of the Nat Geo Wild channel is not the user preference program of the user having a user ID of 3 and thus may not be notified to the user having a user ID of 3.

In the embodiment illustrated in FIGS. 8A and 8B, only the number of times of the user's viewing the program is used to determine the score thereof to determine the user preference program according to the user viewing history. However, the user preference program may be determined variously in addition to using the score based on only the number of times of the user's viewing the program.

According to an embodiment, the recently frequently viewed program may be determined as the user preference program. For example, the data representing the elapse time after the program viewing may be further provided in addition to the score representing the number of times of viewing each program, and the score of the program with a long elapse time after the previous viewing thereof may be set to, for example, 0.

The operation illustrated in FIG. 5 may be performed also by the server 300. When the display device 100 performs operations 510 and 520 and then the user selects the preference program notification setup-on, the following user viewing history management function may be performed by the server 300. The server 300 may manage the user viewing history by managing the history about the broadcast program of the channel selected by the tuner 140 of the display device 100.

Figure 9:
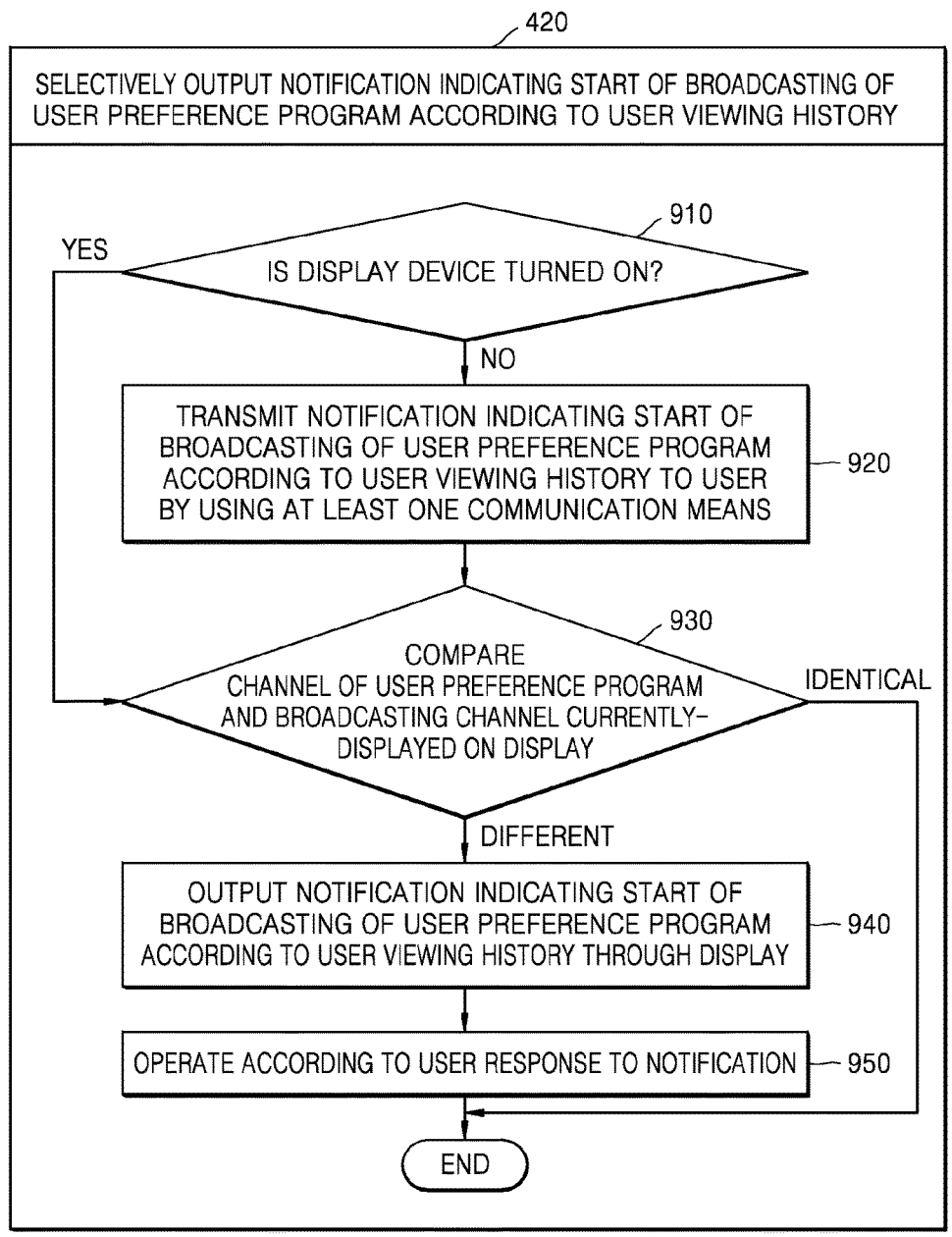
FIG. 9 is a flow diagram illustrating a process for selectively outputting a notification indicating the start of the broadcasting of a user preference program according to a user viewing history in operation 420 illustrated in FIG. 4.

FIG. 9 is a flow diagram illustrating a process for selectively outputting a notification indicating the start of the broadcasting of a user preference program according to a user viewing history in operation 420 illustrated in FIG. 4.

According to an embodiment, the display device 100 may manage the broadcasting time of the program determined as the user preference program in the user preference program database. That is, when the broadcasting time of the user preference program determined according to the user viewing history approaches, the display device 100 may perform the operation of FIG. 9 in order to provide the notification indicating the start of the broadcasting of the user preference program.

According to an embodiment, the display device 100 may manage the broadcasting time of the program determined as the user preference program in the user preference program database with reference to the broadcast program information (e.g., EPG) received through the tuner 140. That is, when the identifier of the user preference program determined according to the user viewing history is detected in the received broadcast program information, the display device 100 may perform the operation of FIG. 9 in order to provide the notification indicating the start of the broadcasting of the user preference program.

The time when the display device 100 will provide the notification indicating the start of the broadcasting of the user preference program determined according to the user viewing history may be determined variously. For example, the display device 100 may provide the above notification about 10 minutes or about 5 minutes before the start of the broadcasting of the user preference program. The time when the above notification will be provided may be determined variously by the display device 100. Alternatively, the display device 100 may output a user interface for receiving, from the user, input information about how many minutes before the start of the broadcasting the user preference program notification will be provided, and the notification function may be performed according to the user input received from the user interface.

Referring to FIG. 9, in operation 910, the display device 100 may determine whether the display device 100 is in the normal mode. When the display device 100 is in the normal mode, operation 930 may be performed, and when the display device 100 is not in the normal mode, operation 920 may be performed.

According to an embodiment, the display device 100 may be implemented to operate some elements of the display device 100 even in the standby mode. For example, even in the standby mode of the display device 100, the power supply 130 of the display device 100 may supply the power to a portion of the controller 180 and the storage 190 to execute some function of the display device 100, that is, the user preference program notification function.

In operation 920, when the display device 100 is not in the normal mode, the display device 100 may transmit the notification indicating the start of the broadcasting of the user preference program according to the user viewing history to the user by using at least one communication means. When the display device 100 is not in the normal mode (that is, when the display device 100 is turned off), since the user does not view the user preference program according to the user viewing history, the display device 100 may perform the notification function to notify the start of the broadcasting of the user preference program to the user.

According to an embodiment, the display device 100 may transmit the notification indicating the start of the broadcasting of the user preference program according to the user viewing history to the e-mail address of the user by using an e-mail, or to the mobile device 200 of the user by using a text message or an SMS. Which communication means will be used to perform the notification may be determined according to the communication means that is selected or input by the user through the user interface as illustrated in FIG. 6.

Figure 10:
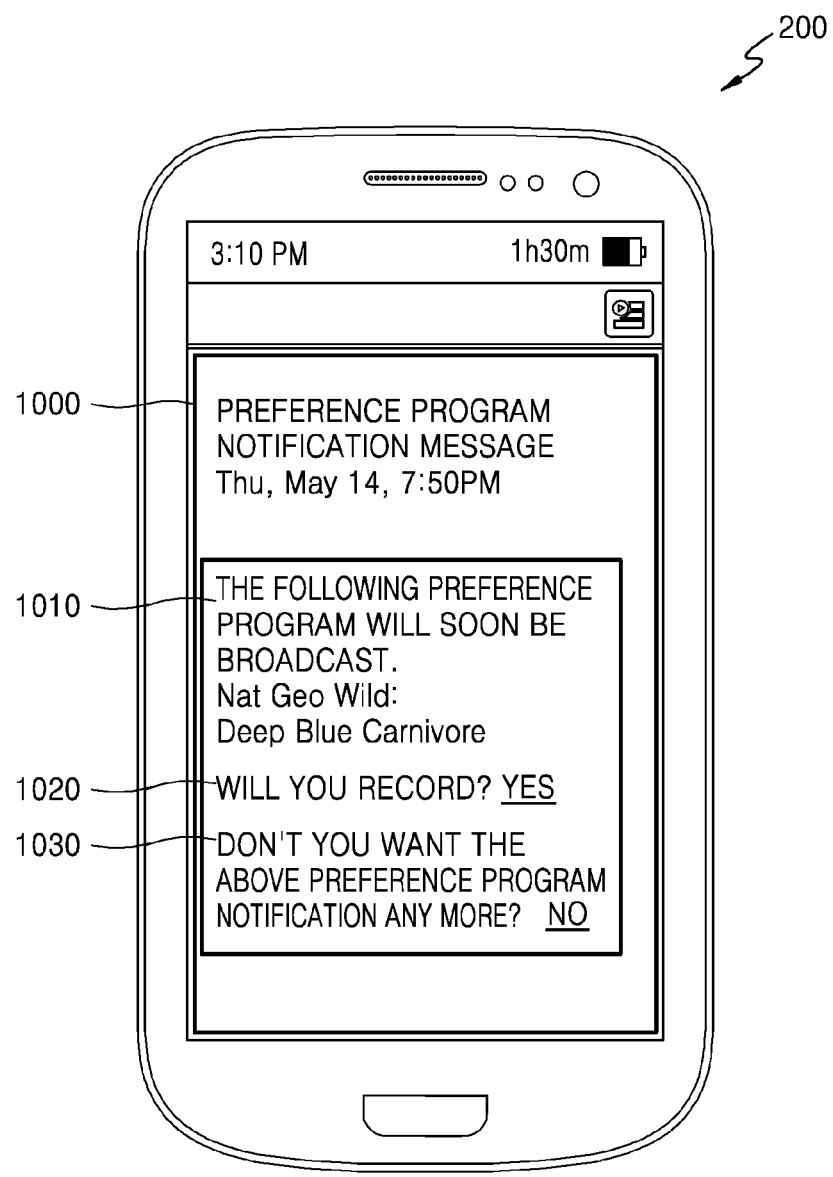
FIG. 10 illustrates an example of providing a user preference program notification to the user by the display device 100 by using an SMS.

FIG. 10 illustrates an example of providing a user preference program notification to the user by the display device 100 by using an SMS.

Referring to FIG. 10, the display device 100 may transmit a preference program notification message 1000 to the mobile device 200, wherein the preference program notification message 1000 may include a user preference program notification item 1010, a recording option item 1020, and a preference program notification stop item 1030.

The user preference program notification item 1010 may include a message such as <THE FOLLOWING PREFERENCE PROGRAM WILL SOON BE BROADCAST. Nat Geo Wild: Deep Blue Carnivore> to notify the start of the broadcasting of the user preference program determined according to the user viewing history.

The recording option item 1020 may include a message <WILL YOU RECORD?> to provide the user with an option for allowing the user to automatically record the user preference program. For example, when the user selects <YES>, this selection signal may be transmitted to the display device 100 to be used as a command for recording the user preference program by the display device 100.

The preference program notification stop item 1030 may include a message <DON'T YOU WANT THE ABOVE PREFERENCE PROGRAM NOTIFICATION ANY MORE? NO> to set the user not to receive the notification of the user preference program any more. For example, when the user selects <NO>, this selection signal may be transmitted to the display device 100 and then the display device 100 may recognize the selection signal as a negative feedback to exclude the program from the preference program list. Excluding the program from the preference program list may include setting the score of the program to be 0 or to be smaller than a certain value in the database as illustrated in FIG. 6.

For example, when the user does not turn on the display device 100 and does not view the preference program despite the preference program notification message 1000 displayed on the mobile device 200, the display device 100 may determine that the user shows a negative reaction to the preference program and then may decrease the score of the program in the user preference program database by 1.

The message form illustrated in FIG. 10 is merely an example and may be variously determined.

Referring to FIG. 9, in operation 930, the display device 100 may compare the channel of the user preference program and the broadcasting channel currently-displayed on the display.

That is, the display device 100 may determine whether the user currently views the broadcasting of the user preference program, by comparing the channel of the user preference program and the broadcasting channel currently-displayed on the display. As a result of the comparison, when the channel of the user preference program is identical to the broadcasting channel currently-displayed on the display, since the user currently views the broadcasting of the user preference program, the flow may be ended because there may be no need to perform a notification function. However, according to an embodiment, for example, the display device 100 may increase the score of the program stored in the database.

As a result of the comparison, when the channel of the user preference program is not identical to the broadcasting channel currently-displayed on the display, since the user does not currently view the broadcasting of the user preference program, operation 940 may be performed to notify the start of the broadcasting of the user preference program to the user.

In operation 940, the display device 100 may display the notification indicating the start of the broadcasting of the user preference program according to the user viewing history.

The display device 100 may output the notification indicating the start of the broadcasting of the user preference program according to the user viewing history by using various user interfaces.

Figure 11A:
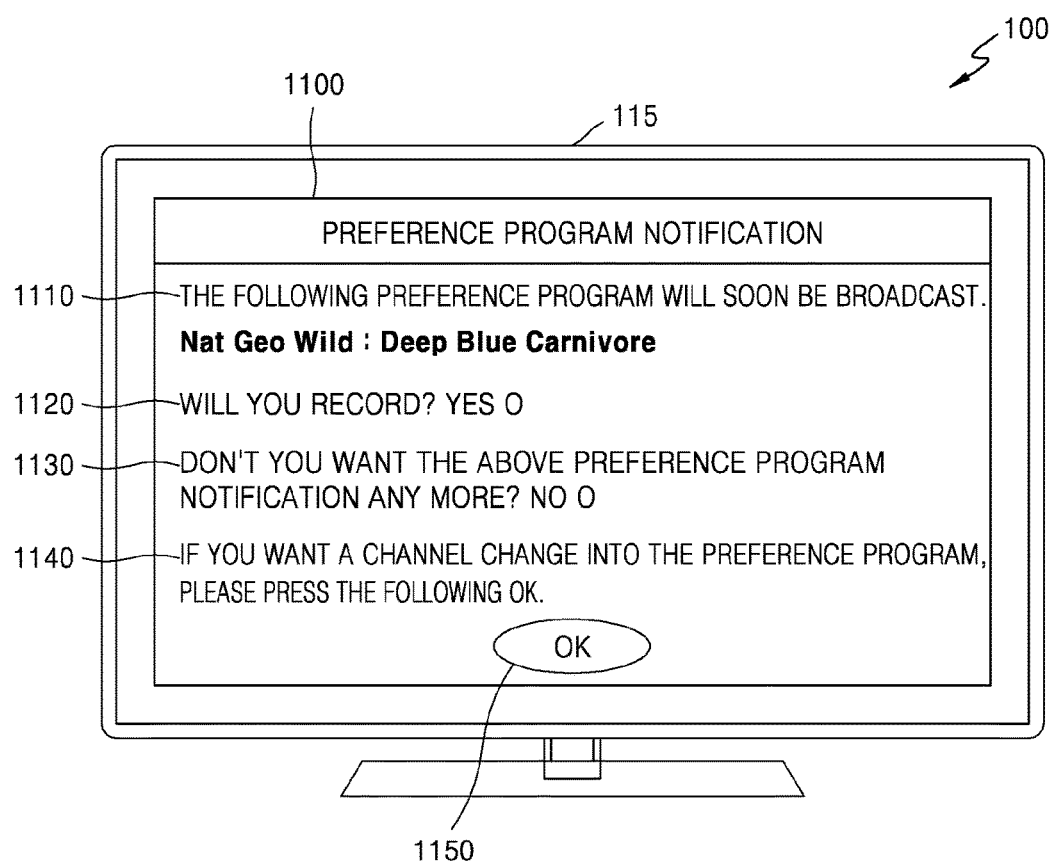
FIG. 11A illustrates an example of a user interface for providing a notification indicating the start of the broadcasting of a user preference program according to an embodiment.

FIG. 11A illustrates an example of a user interface for providing a notification indicating the start of the broadcasting of a user preference program according to an embodiment.

Referring to FIG. 11A, the display device 100 may display a user interface 1100 for preference program notification on the display 115.

The user interface 1100 may include a user preference program notification item 1110, a recording option item 1120, a preference program notification stop item 1130, and a channel change item 1140.

The user preference program notification item 1110 may include a message <THE FOLLOWING PREFERENCE PROGRAM WILL SOON BE BROADCAST. Nat Geo Wild: Deep Blue Carnivore> to notify the start of the broadcasting of the user preference program determined according to the user viewing history.

The recording option item 1120 may include a message <WILL YOU RECORD?> to provide the user with an option for allowing the user to automatically record the user preference program. For example, when the user selects <YES>, this selection signal may be used as a command for causing the display device 100 to record the user preference program.

The preference program notification stop item 1130 may include a message <DON'T YOU WANT THE ABOVE PREFERENCE PROGRAM NOTIFICATION ANY MORE? NO> to set the user not to receive the notification of the preference program any more. For example, when the user selects <NO>, the display device 100 may recognize the selection signal as a negative feedback to exclude the program from the preference program list. Excluding the program from the preference program list may include setting the score of the program to be 0 or to be smaller than a certain value in the database as illustrated in FIG. 6.

The channel change item 1140 may include a message <IF YOU WANT A CHANNEL CHANGE INTO THE PREFERENCE PROGRAM, PLEASE PRESS THE FOLLOWING OK.> to allow the user to change the channel into the preference program just by selecting an <OK> item 1150 without the need to find the channel by using the control device 250. The display device 100 may perform control to receive the broadcast signal of the preference program by controlling the tuner 140 according to the control signal of the control device 250 for selecting the <OK> item 1150.

For example, when the user does not change the channel and does not view the preference program despite the user interface 1100, the display device 100 may determine that the user shows a negative reaction to the preference program and then may decrease the score of the program in the user preference program database by 1.

In the example of the user interface 1100 illustrated in FIG. 11A, since the user interface 1100 completely fills the screen of the display device 115, it may block the user from viewing the currently-displayed broadcast program. Therefore, a simple and small user interface may be used as illustrated in FIG. 11B.

Figure 11B:
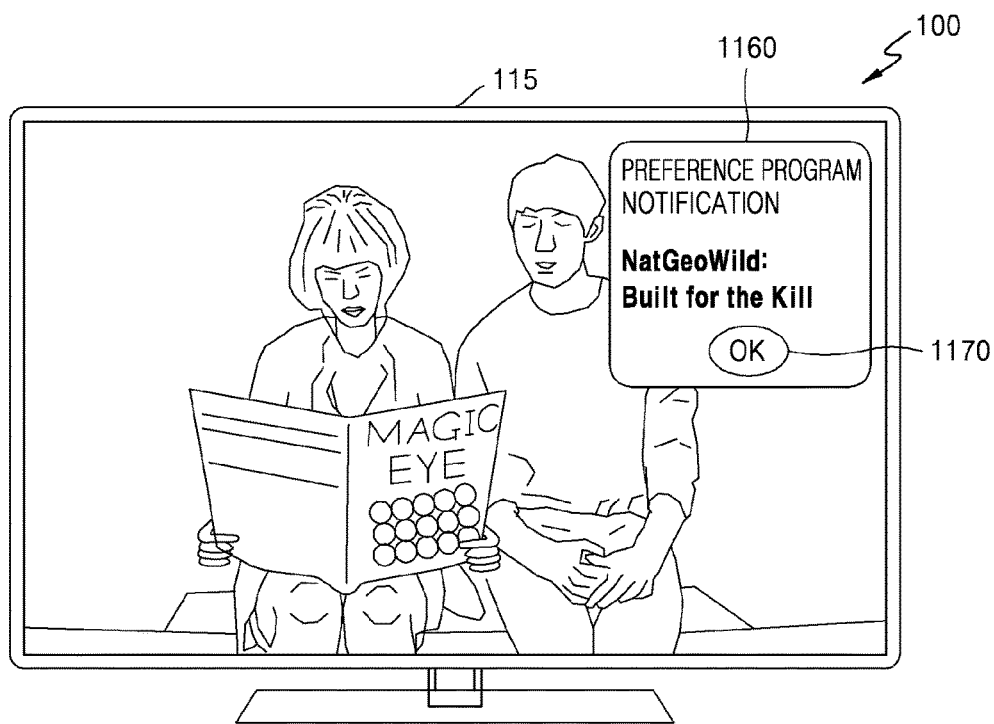
FIG. 11B illustrates an example of a user interface for providing a notification indicating the start of the broadcasting of a user preference program according to an embodiment.

FIG. 11B illustrates an example of a user interface for providing a notification indicating the start of the broadcasting of a user preference program according to an embodiment.

Referring to FIG. 11B, the display device 100 may display a user interface 1160 for preference program notification on a right top portion of the display 115. The user interface 1160 may simply include a message <PREFERENCE PROGRAM NOTIFICATION Nat Geo Wild: Built for the Kill> and an <OK> item 1170 for directly moving to the channel. The display device 100 may change into the channel of the preference program according to a signal for selecting the <OK> item 1170 by the user by using the control device 250.

Unlike in the example of FIG. 11A, in the case of FIG. 11B, since the user interface 1160 is displayed only on a portion of the screen of the display 115, the display device 100 may notify the user preference program according to the user viewing history without blocking the user from viewing the currently-displayed broadcast program.

Figure 11C:
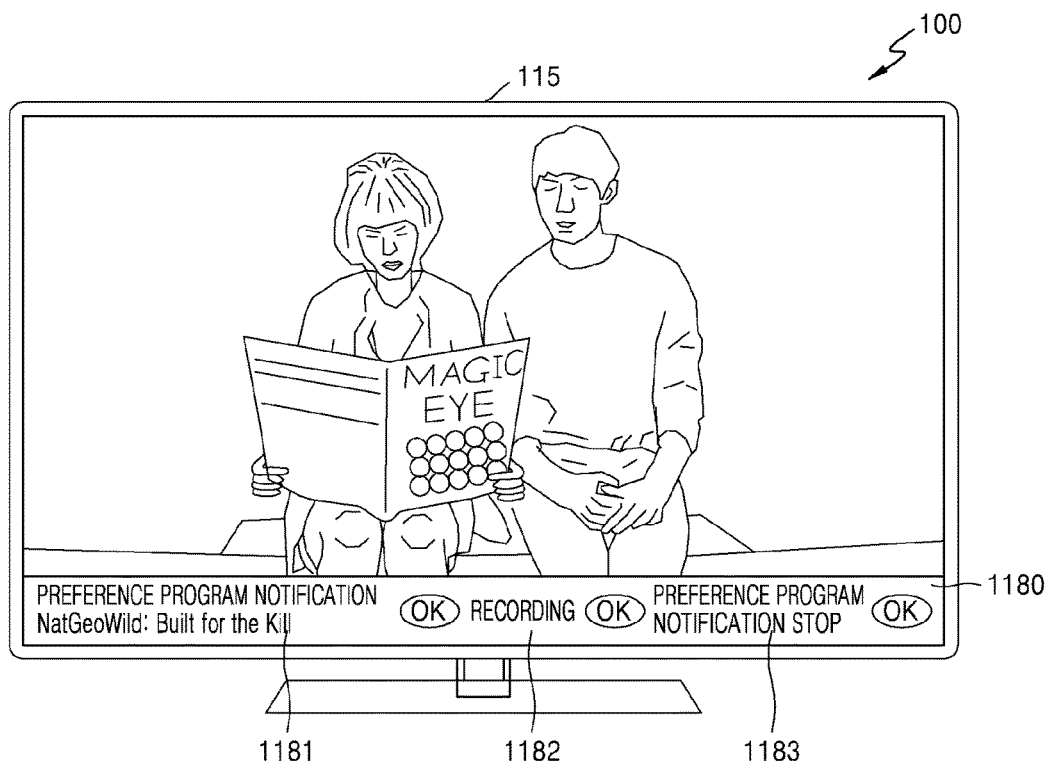
FIG. 11C illustrates an example of a user interface for providing a notification indicating the start of the broadcasting of a user preference program according to an embodiment.

FIG. 11C illustrates an example of a user interface for providing a notification indicating the start of the broadcasting of a user preference program according to an embodiment.

Referring to FIG. 11C, the display device 100 may display a user interface 1180 for preference program notification on the display 115.

The user interface 1180 may include a user preference program notification item 1181, a recording option item 1182, and a preference program notification stop item 1183.

The user preference program notification item 1181 may include a message <PREFERENCE PROGRAM NOTIFICATION Nat Geo Wild: Built for the Kill, OK> to notify the start of the broadcasting of the user preference program determined according to the user viewing history. For example, when the user selects <OK>, the display device 100 may change into the channel of the preference program.

The recording option item 1182 may include a message <RECORDING, OK> to provide the user with an option for allowing the user to automatically record the user preference program. For example, when the user selects <OK>, this selection signal may be used as a command for causing the display device 100 to record the user preference program.

The preference program notification stop item 1183 may include a message <PREFERENCE PROGRAM NOTIFICATION STOP, OK> to set the user not to receive the notification of the preference program any more. For example, when the user selects <OK>, the display device 100 may recognize the selection signal as a negative feedback to exclude the program from the preference program list.

In operation 950, the display device 100 may operate according to a user response to the notification.

When receiving a user input as a response to the user interface illustrated in FIGS. 11A to 11C, the display device 100 may perform an operation corresponding to the user input. For example, in response to the user input indicating a channel change, the controller 180 of the display device 100 may control the tuner 140 to receive the broadcast signal of the changed channel or may perform an operation to record the user preference program.

According to an embodiment, the display device 100 may reflect the user's positive or negative reaction to the user preference program notification in the user preference program database 192. The user's positive reaction to the user preference program may be used to increase the score of the user preference program by a certain value, and the user's negative reaction to the user preference program may be used to decrease the score of the user preference program by a certain value.

For example, when the user selects the <OK> item 1150 in response to the user interface 1100 illustrated in FIG. 11A, since the user shows a positive reaction for viewing the user preference program, the display device 100 may increase the score of the user preference program in response to the positive reaction.

For example, when the user selects <YES> in the preference program notification stop item 1130 in response to the user interface 1100 illustrated in FIG. 11A, since the user shows a negative reaction for not viewing the user preference program, the display device 100 may decrease the score of the user preference program in response to the negative reaction. In this case, since the user does not want the program viewing without channel change and also does not want the preference program notification, the score of the user preference program may be set to a default value of 0. Also, the program with this reaction may be set not to be notified as the preference program for a certain time period.

The operation illustrated in FIG. 9 may be performed also by the server 300.

Figure 12:
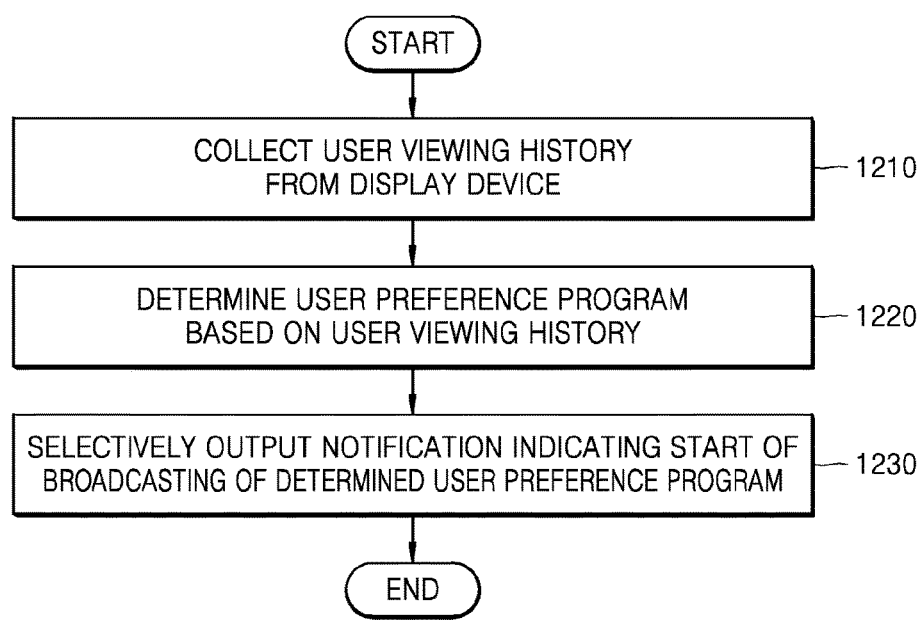
FIG. 12 is a flow diagram illustrating a process for managing a user viewing history by the server 300 according to an embodiment.

FIG. 12 is a flow diagram illustrating a process for managing a user viewing history by the server 300 according to an embodiment.

Referring to FIG. 12, in operation 1210, the server 300 may collect the user viewing history from the display device 100. When the display device 100 monitors the broadcast signal selected by the user and transmits information about the monitored broadcast program to the server 300, the server 300 may collect the user viewing history of the display device 100 by storing information about the broadcast program received from the display device 100.

In operation 1220, the server 300 may determine the user preference program based on the collected user viewing history. The server 300 may determine the user preference program according to the user viewing history by using various prediction models. For example, the various prediction models may determine the user preference program according to the frequent viewing history, the recent viewing history, or the recent frequent viewing history.

In operation 1230, the server 300 may selectively output the notification indicating the start of the broadcasting of the determined user preference program.

When the broadcasting time of the determined user preference program approaches, the server 300 may notify the start of the broadcasting of the user preference program to the user directly or through the display device 100.

According to an embodiment, the server 300 may transmit a command for instructing the display device 100 to display the notification indicating the start of the broadcasting of the user preference program, to the display device 100.

According to an embodiment, the server 300 may store information about the e-mail address or the mobile phone number of the user for notification reception by user and transmit the notification indicating the start of the broadcasting of the user preference program through an e-mail or a text message.

According to an embodiment, the server 300 transmit a command for instructing the display device 100 to transmit the notification indicating the start of the broadcasting of the user preference program through an e-mail or a text message.

According to the above embodiments, the user may view the usual favorite TV program in time without directly controlling the device. The user preference program notification may provide the user's convenience by providing a viewing notification and also inquiring about whether to record the program when the user may not view the TV.

The term "module" used herein may refer to, for example, a unit including any combination of one or more of hardware, software, and firmware. For example, the term "module" may be used interchangeably with the term "unit", "logic", "logical block", "component", or "circuit". The module may be a portion or a minimum unit of an integrated component. The module may be a portion or a minimum unit for performing one or more functions. The module may be mechanically or electronically implemented. For example, the module according to various embodiments may include at least one of an application-specific integrated circuit (ASIC) chip, field-programmable gate arrays (FPGAs), and a programmable-logic device for performing operations which are known or will be developed hereafter.

According to various embodiments, at least some of the devices (e.g., modules or functions thereof) or methods (e.g., operations) according to the various embodiments may be implemented by, for example, an instruction stored in a computer-readable storage medium in the form of a programming module. When the instruction is executed by one or more processors, the one or more processors may perform a function corresponding to the instruction. The computer-readable storage medium may be, for example, a memory. At least a portion of the programming module may be implemented (e.g., executed) by, for example, the processor. At least a portion of the programming module may include, for example, a module, a program, a routine, an instruction set, or a process for performing one or more functions.

The computer-readable storage medium may include, for example, a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and perform a program instruction (e.g., a programming module), such as a read-only memory (ROM), a random-access memory (RAM), or a flash memory. Also, the program instruction may include, for example, a machine language code created by a compiler, and a high-level language code that may be executed by a computer by using an interpreter. The hardware device may be configured to operate as one or more software modules in order to perform the operation of various embodiments, and vice versa.

The programming module or the module according to various embodiments may include at least one of the above elements, some of the above elements may be omitted, or additional other elements may be further included therein. The operations performed by the module, the programming module, or other elements according to various embodiments may be executed sequentially, in parallel, repeatedly, or in a heuristic manner. Also, some operations may be executed in a different order, may be omitted, or may additionally include other operations.

For clear understanding, the embodiments of the inventive concept have been described above with reference to different functional units and processes. However, it will be apparent that the functions may be properly distributed among the different functional units or processors without departing from the spirit and scope of the inventive concept. For example, the functions described as being performed by the processors or controllers independent of each other may also be performed by the same processor or controller and may also be interchanged with each other in some cases. Thus, the references to certain functional units should be construed merely as the references to suitable means performing the functions thereof, rather than the references to strict logical or physical structures or configurations.

Although the inventive concept has been described with reference to some embodiments, it will not be limited to the specific forms set forth herein. Rather, the scope of the inventive concept will be limited only by the claims. Also, although the features of the inventive concept may seem to be described in connection with only some embodiments, it will be apparent to those of ordinary skill in the art that the above embodiments may be combined properly according to the inventive concept. In the claims, the term "comprise" or "include" may specify the presence of stated elements or operations but do not preclude the presence or addition of one or more other elements or operations.

Furthermore, although individually listed, a plurality of means, elements, or operations may be implemented by a single unit or processor. Also, although individual features may be included in different claims, these features may possibly be advantageously combined, and the inclusion in different claims does not imply that a combination of the features is infeasible or disadvantageous. Also, the inclusion of a feature in one category of claims does not imply a limitation to only this category, but rather the feature may be equally applied to other claim categories in an appropriate manner.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a display;
   a communicator; and
   a controller configured to collect a user viewing history, identify a user preference program according to the collected user viewing history, and selectively output, to a user, a notification indicating a start of a broadcasting of the identified user preference program,
   wherein the controller is further configured to:
   identify whether the electronic device is in a normal mode or in a standby mode,
   control the communicator to transmit a signal corresponding to the notification indicating the start of the broadcasting of the user preference program to an external device based on identifying that the electronic device is in the standby mode,
   compare a channel of the user preference program and a channel of a broadcasting currently-displayed on the display based on identifying that the electronic device is in the normal mode, and
   control the display to display the notification indicating the start of the broadcasting of the user preference program based on the comparison.

2. The electronic device of claim 1, wherein
   the controller is further configured to control the communicator to transmit the notification to the user through an e-mail or a text message when the electronic device is in the standby mode.

3. The electronic device of claim 1, wherein the notification comprises a recording schedule option of the user preference program.

4. The electronic device of claim 1, wherein the controller is further configured to update a user preference program database corresponding to the user viewing history, in response to detection of a negative/positive reaction of the user to a user preference program notification, based on the reaction.

5. The electronic device of claim 1, wherein the user preference program corresponding to the user viewing history is set on a user-by-user basis.

6. The electronic device of claim 1, wherein the controller is further configured to control the display to output a user interface for setting about whether to receive a user preference program notification according to the user viewing history.

7. The electronic device of claim 1, wherein the display is configured to output a user interface indicating a setup of a user preference program notification according to the user viewing history.

8. The electronic device of claim 1, wherein the controller receives the user viewing history from the external device through the communicator.

9. The electronic device of claim 8, wherein the controller is further configured to control the communicator to transmit a command for instructing to output the notification indicating the start of the broadcasting of the identified user preference program, to the external device.

10. A method for providing a user preference program notification in an electronic device, the method comprising:
    collecting a user viewing history;
    identifying a user preference program according to the collected user viewing history; and
    selectively outputting, to a user, a notification indicating a start of a broadcasting of the user preference program identified according to the user viewing history,
    wherein the selectively outputting the notification comprises:
    identifying whether the electronic device is in a normal mode or in a standby mode,
    transmitting a signal corresponding to the notification indicating the start of the broadcasting of the user preference program to an external device via a communicator based on identifying that the electronic device is in the standby mode,
    comparing a channel of the user preference program and a channel of a broadcasting currently-displayed on a display based on identifying that the electronic device is in the normal mode, and
    displaying the notification indicating the start of the broadcasting of the user preference program via the display based on the comparison.

11. The method of claim 10, wherein the selectively outputting the notification comprises:
    transmitting the notification to the user through an e-mail or a text message when the electronic device is in the standby mode.

12. The method of claim 10, wherein the notification comprises a recording schedule option of the user preference program.

13. The method of claim 10, further comprising updating a user preference program database corresponding to the user viewing history, in response to detection of a negative/positive reaction of the user to a user preference program notification, according to the reaction.

14. The method of claim 10, wherein the user preference program corresponding to the user viewing history is set on a user-by-user basis.

15. The method of claim 10, further comprising outputting, through the display, a user interface for setting about whether to receive a user preference program notification according to the user viewing history.

16. The method of claim 15, further comprising outputting, through the display, a user interface indicating a setup of a user preference program notification according to the user viewing history.

17. The method of claim 10, further comprising receiving the user viewing history from the external device through the communicator.

18. The method of claim 17, further comprising transmitting a command for instructing to output the notification indicating the start of the broadcasting of the identified user preference program, to the external device through the communicator.

\* \* \* \* \*